(12) United States Patent
Cheng

(10) Patent No.: US 7,224,134 B2
(45) Date of Patent: May 29, 2007

(54) DEVICE FOR CONTROLLING INDUCTIVE LOAD

(75) Inventor: Chi-Yuan Cheng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 85 days.

(21) Appl. No.: 11/223,198

(22) Filed: Sep. 8, 2005

(65) Prior Publication Data

US 2007/0052378 A1    Mar. 8, 2007

(51) Int. Cl.
*H02K 21/00* (2006.01)
(52) U.S. Cl. ..................... 318/254; 318/138; 318/439
(58) Field of Classification Search ................ 318/254, 318/138, 439; 123/552; 307/10.8; 315/82
See application file for complete search history.

(56) References Cited

U.S. PATENT DOCUMENTS 4,667,645 A * 5/1987 Gluckman .................. 123/552
6,060,834 A * 5/2000 Vilkinofsky et al. .......... 315/82

* cited by examiner

Primary Examiner—Karen Masih
(74) Attorney, Agent, or Firm—Charles E. Baxley

(57) ABSTRACT

A device for controlling inductive load comprises at least: a power source, a first control assembly, a second control assembly and an inductive load. The first control assembly is connected in series to the power source, and comprises: a relay switch, a relay and a MOSFET, the relay switch is connected to a normal close contact and a normal open contact selectively. The normal open contact is electrically connected to the MOSFET, the normal close contact is connected to a drain terminal of the MOSFET, and a source terminal of the MOSFET is connected to the power source. The second control assembly is structurally similar to the first control assembly. The inductive load is disposed between the normal close contact of the relay switch and the normal close contact of the relay switch.

20 Claims, 3 Drawing Sheets

DEVICE FOR CONTROLLING INDUCTIVE LOAD

BACKGROUND OF THE INVENTION

1. Field of the Invention

The present invention relates to a device for controlling inductive load, which is employed to control the inductive loads (such as motor, DC electromotor and etc) and can prevent the contact of the relay switch from producing sparks, thus prolonging the service and increasing the reliability of the relay switch.

2. Description of the Prior Art

With the development of inductive load system, all kinds of technologies for controlling inductive load and the related products have become the indispensable part of many precision machines.

A conventional inductive load (such as: motor, DC motor and etc) controlling system is one of the technologies for controlling inductive load and is shown in FIG. 1 (U.S. Pat. No. 6,487,062 B1), wherein the circuit system includes an inductive load 10 (namely a DC motor), two relays 11 and 12, and two relay switches 13 and 13a. The relays 11 and 12 serve to control the two relay switches 13 and 13a and the inductive load 10. The two relay switches 13 and 13a each has a electrically common contact 131 and 131a, a normal close contact 132 and 132a, a normal open contact 133 and 133a, and an elastic metal piece 134 and 134a. The inductive load 10 is connected to the electrically common contacts 131, 131a of the relay switches 13 and 13a, and the normal close contacts 132 and 132a of the two relay switches 13 and 13a are to the electrically common contacts 131 and 131a, respectively, via the elastic metal pieces 134 and 134a (the electrically common contacts 131 and 131a are electrically connected to the normal close contacts 132 and 132a at normal condition). The circuit is further connected with a metal oxide semiconductor field effect transistor (MOSFET) and a DC supply 15. The relay switches 13 and 13a are parallel to each other. The MOSFET 14 and the DC supply 15 are connected in series to the relay switches 13 and 13a in such a manner that a positive electrode of the DC supply 15 is connected to the relay switches 13 and 13a and the negative electrode of the DC supply 15 is connected to the MOSFET 14.

When the relay 11 produces a field coil current and the elastic metal piece 134 of the relay switch 13 is moved from the normal close contact 132 to the normal open contact 133, namely, the electrically common contact 131 is electrically connected to the normal open contact 133. At this moment, the current generated from the positive electrode of the DC supply 15 will be transmitted to the negative electrode of the DC supply 15 after passing through the normal open contact 133 of the relay 11, the elastic metal piece 134, the electrically common contact 131, the inductive load 10, the electrically common contact 131a of the relay switch 13a, the elastic metal piece 134a, the normal close contact 132a and the MOSFET 14, respectively. Meanwhile, the GATE of the MOSFET 14 must provide a turn-on voltage, so that the inductive load 10 can run forwardly.

On the other hand, when the relay 11 produces a field coil current and the elastic metal piece 134a of the relay switch 13a is moved from the normal close contact 132a to the normal open contact 133a, namely, the electrically common contact 131a is electrically connected to the normal open contact 133a. At this moment, the current generated from the positive electrode of the DC supply 15 will be transmitted to the negative electrode of the DC supply 15 after passing through the normal open contact 133a of the relay switch 13a of the relay 12, the electrically common contact 131 of the relay switch 13 of the relay 11, the elastic metal piece 134, the normal close contact 132 and the MOSFET 14, respectively. Meanwhile, the GATE of the MOSFET 14 must provide a turn-on voltage, so as to make the inductive load 10 run in reverse.

This conventional inductive load controlling method still has some shortcomings as follows:

First, the relays 11 and 12 must be provided with a predetermined magnetized voltage in order to make the GATE of the MOSFET 14 produce a control voltage, therefore, the control circuit will be too complicated, and accordingly the production cost will be high.

Second, the GATE of the MOSFET 14 must produce a control voltage, however this control voltage will be produced firstly, and then if the voltage of the relay 11 or 12 is produced after the control voltage, it will cause damage to the contact 133 or 133a of the relay 11 or 12 because of the instantly increased current.

Third, as shown in FIG. 1, the user must prepare another control system in order to ensure that the relays 11 and 12 are turned on before the MOSFET 14, and this also needs a time-delay device.

Fourth, when the relays 11 and 12 are turned on synchronously, the current previously flowed in the load will produce sparks at the relay switches 13, 13a of the relays 11 and 12, and will cause damage.

The present invention has arisen to mitigate and/or obviate the afore-described disadvantages.

SUMMARY OF THE INVENTION

The primary objective of the present invention is to provide a simplified device for controlling inductive load, by using two MOSFET connected with the normal open contacts of two relays, the relays can drive the MOSFET instantly after being turned on. Therefore, the inductive load can be controlled more easily and the cost of the control device will be reduced.

The secondary objective of the present invention is to provide a device for controlling inductive load that can prevent the occurrence of sparks, when the two relays are turned on, the MOSFET and the contact of the relays can be prevented from sparks, thus prolonging the service and increasing the reliability of the relay switch.

Another objective of the present invention is to provide a device for controlling inductive load that can protect the relay, wherein two diodes are arranged in the circuit and are used to consume the energy previously stored on the relay, so that the contact of the relay can be well protected.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
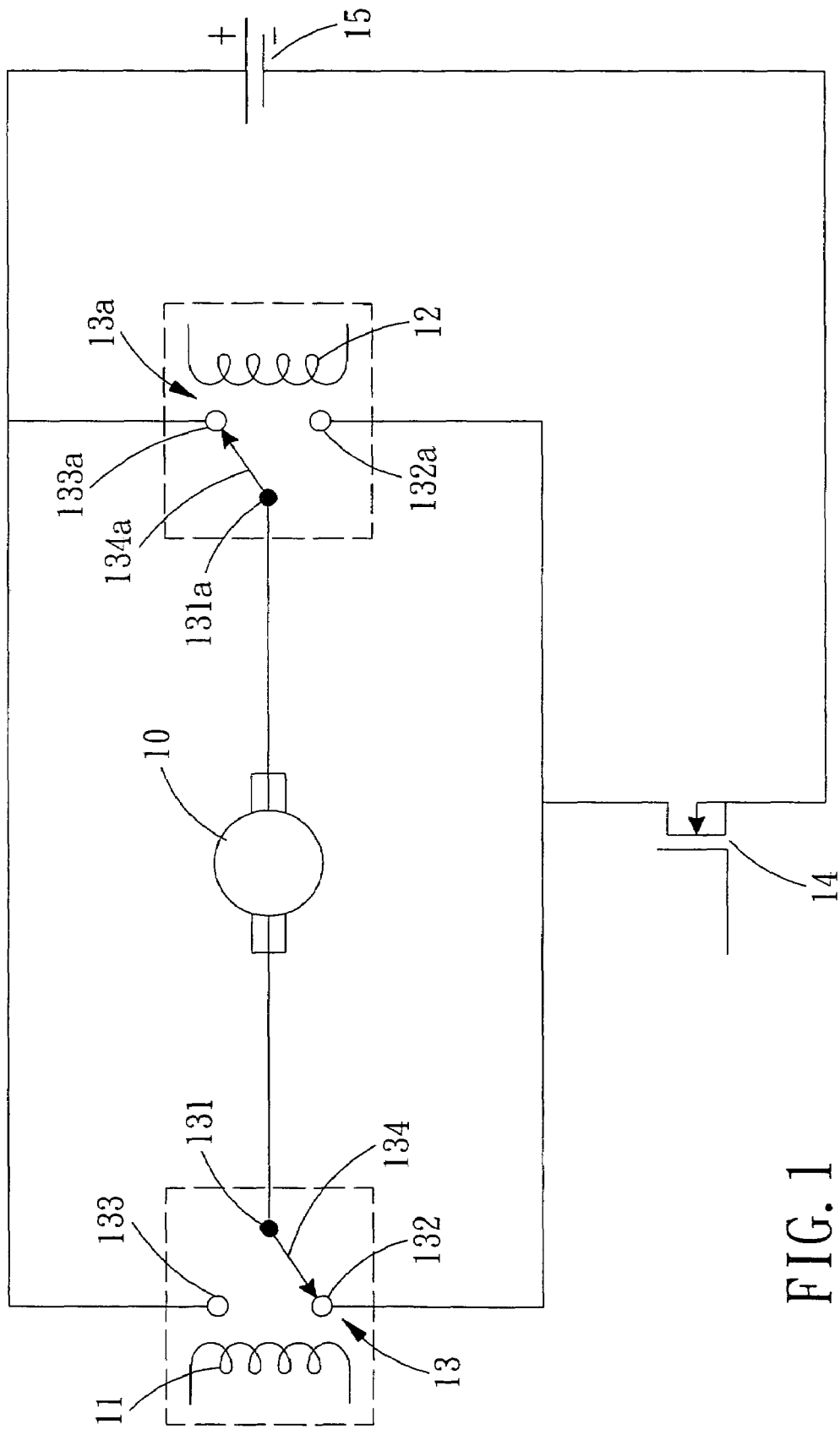
FIG. 1 is a circuit diagram of a conventional device for controlling inductive load.
Figure 2:
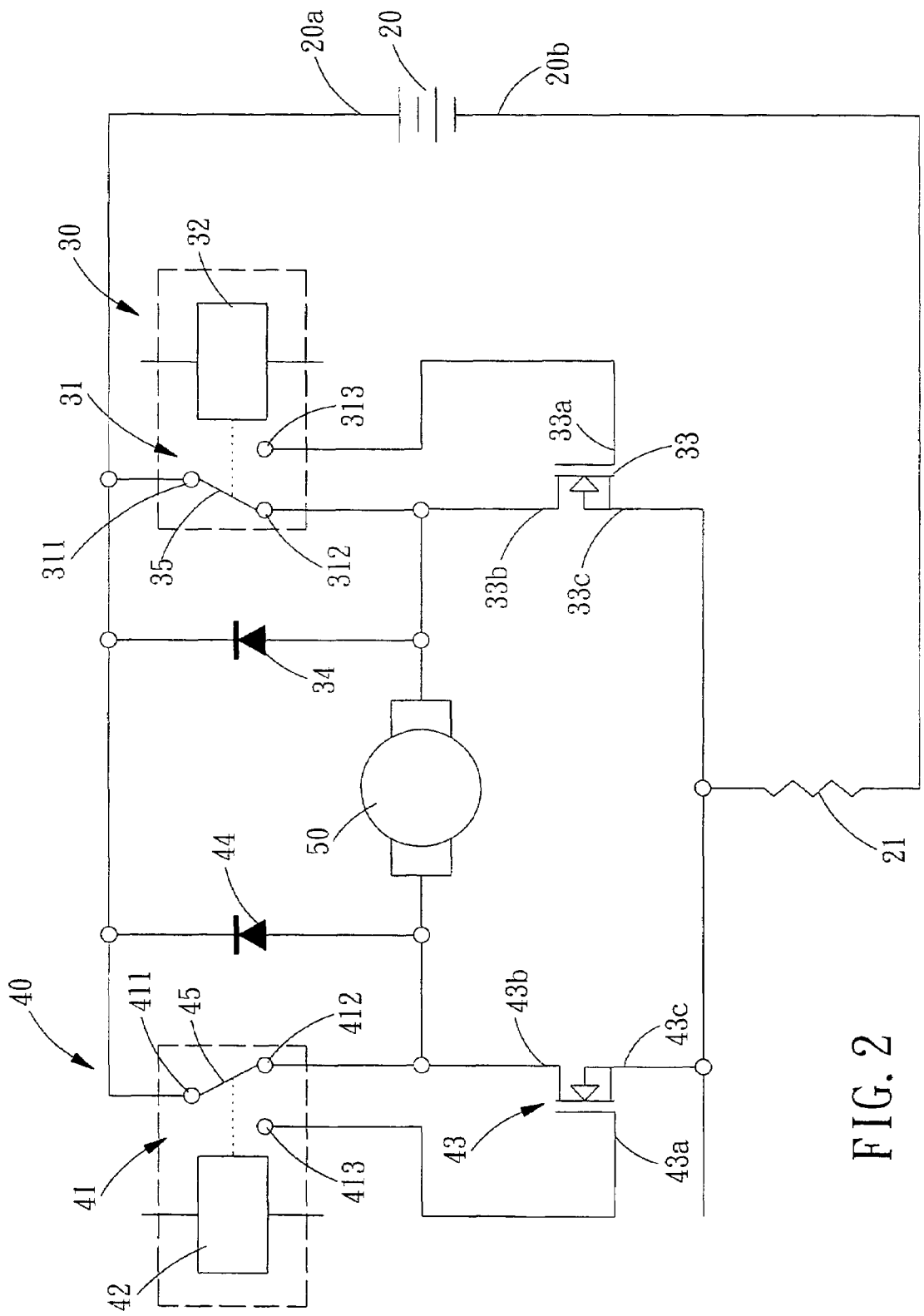
FIG. 2 is a circuit diagram of a device for controlling inductive load in accordance with a first preferred embodiment of the present invention.

Referring to FIG. 2, a device for controlling inductive load in accordance with a first preferred embodiment of the present invention is shown and comprises a power source 20, a resistance 21, a first control assembly 30, a second control assembly 40 and an inductive load 50.

The power source 20 is installed in the circuit and includes a positive electrode 20 and a negative electrode 20b.

The resistance 21 serves as a current sensor and is electrically connected in series to the negative electrode 20b of the power source 20.

The first control assembly 30 is connected in series between the positive electrode 20a of the power source 20 and the resistance 21, and comprises: a relay switch 31, a relay 32, a MOSFET 33 and a diode 34. The MOSFET 33 is a N-type MOSFET. The relay switch 31 has a common contact 311 that is electrically connected to a normal close contact 312 and a normal open contact 313 selectively via an elastic conductive piece 35. The common contact 311 is electrically connected to the positive electrode 20a of the power source 20. The relay 32 serves to control the elastic conductive piece 35. The normal open contact 313 is electrically connected to the gate 33a of the MOSFET 33, the normal close contact 312 is electrically connected to the drain terminal 33b of the MOSFET 33, and the source terminal 33c of the MOSFET 33 is connected to the resistance 21. The diode 34 is connected between the common contact 311 and the normal close contact 312. By such arrangements, a loop is formed.

The second control assembly 40 is electrically connected in series between the positive electrode 20a of the power source 20 and the resistance 21, so that the second control assembly 40 is parallel to the first control assembly 30. The second control assembly 40 comprises a relay switch 41, a relay 42, a N-type MOSFET 43 and a diode 44. The relay switch 41 has a common contact 411 that is electrically connected to a normal close contact 412 and a normal open contact 413 selectively via an elastic conductive piece 45. The common contact 411 is electrically connected to the positive electrode 20a of the power source 20. The relay 42 serves to control the elastic conductive piece 45. The normal open contact 413 is electrically connected to the gate 43a of the MOSFET 43, the normal close contact 412 is electrically connected to the drain terminal 43b of the MOSFET 43, and the source terminal 43c of the MOSFET 43 is connected to the resistance 21. The diode 44 is connected between the common contact 411 and the normal close contact 412 of the relay switch 41, thus forming a loop.

The inductive load 50 is a motor disposed between the normal close contact 312 of the relay switch 31 and the normal close contact 412 of the relay switch 41 in such a manner that both ends of the motor are electrically connected to the diodes 34 and 44, respectively.

Figure 3:
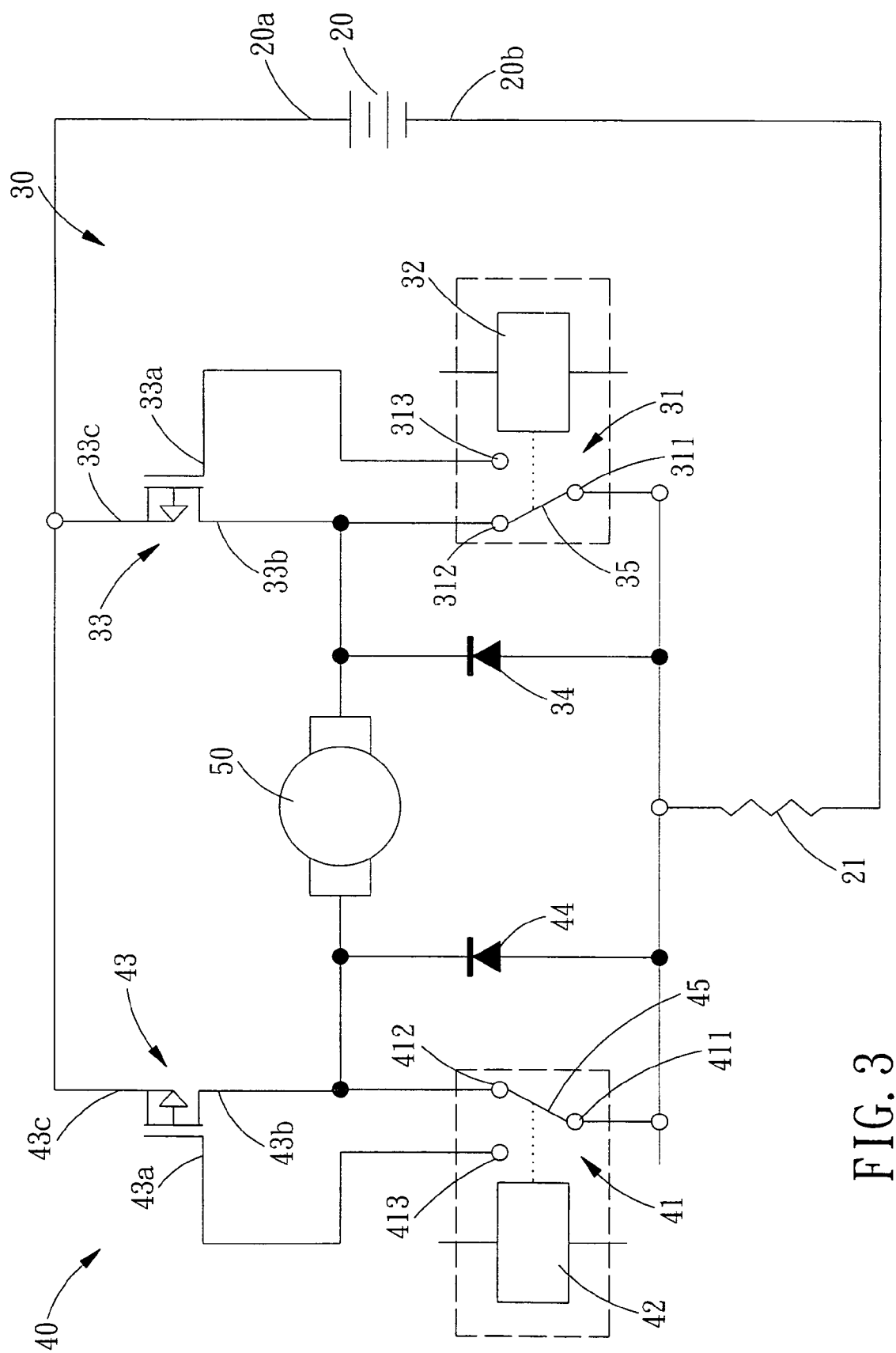
FIG. 3 is a circuit diagram of a device for controlling inductive load in accordance with a second preferred embodiment of the present invention.

Referring to FIG. 3, a device for controlling inductive load in accordance with a second preferred embodiment of the present invention is shown and comprises a power source 20, a resistance 21, a first control assembly 30, a second control assembly 40 and an inductive load 50. This embodiment is similar to the first embodiment, except that: the MOSFET 33 and 43 are P-type MOSFET, and the first and second control assemblies 30 and 40 are arranged in reverse order, such that the common contacts 411 and 311 are electrically connected to the resistance 21, and the source terminals 33c and 43c of the MOSFET 33 and 43 are connected to the positive electrode 20a of the power source 20.

For a better understanding of the present invention, its operation and function, reference should be made to the following descriptions:

The gates 33a and 43a of the N-type MOSFET 33 and 43 are electrically connected to the normal open contacts 313 and 413 of the relay switches 31 and 41, respectively, for turning on/off the N-type MOSFET 33 and 43. The difference of the second embodiment as compared to the first embodiment is that the first and second control assemblies 30 and 40 are arranged in reverse order.

For the first embodiment:

After the coils of the relay 42 of the second control assembly 40 are magnetized, the elastic conductive piece 45 will be shifted from the normal close contact 412 to the normal open contact 413 because of magnetic field effect. At this moment, the common contact 411 will be electrically connected to the normal open contact 413, and the power source 20 will provide power for the Gate 43a of the N-type MOSFET 43, thus turning on the source terminal 43b and the drain terminal 43c of the N-type MOSFET 43.

At this moment, the power source 20 will create a current loop flowing from the positive terminal 20a to the common contact 311 of the relay switch 31 of the first control assembly 30. The elastic conductive member 35 of the relay switch 31 keeps contacting the normal close contact 312. Therefore, the current will pass through the inductive load 50 and make it work, and then will flow back to the negative terminal 20b of the power source 20 after flowing through the drain terminal 43b of the N-type MOSFET 43 of the second control assembly 40, the source terminal 43c and the resistance 21. Thus, the inductive load 50 starts running forward.

Since the present invention can create an effective loop and the resistance 21 can serves as a current sensor, the current flowing through the inductive load can be detected by measuring the voltage at both ends of the resistance 21, and accordingly the purpose of controlling and limiting the current can be achieved.

Similarly, after the coils of the relay 32 of the second control assembly 30 are magnetized, the elastic conductive piece 35 will be shifted from the normal close contact 312 to the normal open contact 313 because of magnetic field effect. At this moment, the common contact 311 will be electrically connected to the normal open contact 313, and the power source 20 will provide power for the Gate 33a of the N-type MOSFET 33, thus turning on the source terminal 33b and the drain terminal 33c of the N-type MOSFET 33.

At this moment, the power source 20 will create a current loop flowing from the positive terminal 20a to the common contact 411 of the relay switch 41 of the first control assembly 40. The elastic conductive member 45 of the relay switch 41 keeps contacting the normal close contact 412. Therefore, the current will pass through the inductive load 50 in reverse and make it work, and then will flow back to the negative terminal 20b of the power source 20 after flowing through the drain terminal 33b of the N-type MOSFET 33 of the second control assembly 30, the source terminal 33c and the resistance 21. Thus, the inductive load 50 starts running in reverse.

For the second embodiment:

After the coils of the relay 42 of the second control assembly 40 are magnetized, the elastic conductive piece 45 will be shifted from the normal close contact 412 to the normal open contact 413 because of magnetic field effect. At this moment, the common contact 411 will be electrically connected to the normal open contact 413, and the power source 20 will provide power for the Gate 43a of the P-type MOSFET 43, thus turning on the source terminal 43b and the drain terminal 43c of the N-type MOSFET 43.

At this moment, the power source 20 will create a current loop flowing from the positive terminal 20a to the P-type MOSFET 43 of the second control assembly 40, and then the current will pass through the inductive load 50 and make it work, and finally will flow back to the negative terminal 20b of the power source 20 after flowing through the normal close contact 312 and the common contact 311 of the relay switch 31 of the first control assembly 30. Thus, the inductive load 50 starts running forward.

Similarly, after the coils of the relay 32 of the second control assembly 30 are magnetized, the elastic conductive piece 35 will be shifted from the normal close contact 312 to the normal open contact 313 because of magnetic field effect. At this moment, the common contact 311 will be electrically connected to the normal open contact 313, and the power source 20 will provide power for the Gate 33a of the P-type MOSFET 33, thus turning on the source terminal 33b and the drain terminal 33c of the N-type MOSFET 33.

At this moment, the power source 20 will create a current loop flowing from the positive terminal 20a to the P-type MOSFET 33, and then the current will pass through the inductive load 50 and make it work, and finally will flow back to the negative terminal 20b of the power source 20 after flowing through the normal close contact 412 and the common contact 411 of the relay switch 41 of the second control assembly 40. Thus, the inductive load 50 starts running in reverse.

The method of controlling the inductive load in accordance with the present invention mainly relies on the cooperation of the relay and the MOSFET, it can prevent the occurrence of sparks when turning on/off the MOSFET. Meanwhile, the relay switch of another relay is normally closed, it also can prevent the occurrence of sparks.

If one of the relay switches is driving the inductive load 50 to work while another relay switch is also turned on, this means that two MOSFET are turned on, at this moment, the inductive load will short circuit discharge because of the previous charge. Since there is no existence of substantial contact, it can protect the contact of the relay, prolong the service life and prevent the malfunction of the relay.

The diodes 34 and 44 are disposed between the common contact and the normal close contact of the relay switch, when the relay switches are turned off (stop magnetizing the relay), the energy previously stored in the inductive load 50 will flow to the power source 20 through the diodes 34 and 44, then flow to the common contact of the respective relay switches, and thus the energy can be consumed. At this moment, the energy at any contact of the relay switches can be consumed by the diodes 34 and 44. Therefore, the common contacts 411 and 311 of the relay switches will not generate sparks.

While we have shown and described various embodiments in accordance with the present invention, it should be clear to those skilled in the art that further embodiments may be made without departing from the scope of the present invention.

What is claimed is:

1. A device for controlling inductive load comprising at least: a power source, a first control assembly, a second control assembly and an inductive load;

the power source has a positive electrode and a negative electrode;

the first control assembly is electrically connected in series to the power source, and comprises: a relay switch, a relay and a MOSFET, the relay switch has a common contact that is electrically connected to a normal close contact and a normal open contact selectively via an elastic conductive piece, the common contact is electrically connected to the power source, the relay serves to control the elastic conductive piece, the normal open contact is electrically connected to a gate of the MOSFET, the normal close contact is electrically connected to a drain terminal of the MOSFET, and a source terminal of the MOSFET is connected to the power source;

the second control assembly is electrically connected in series to the power source and is parallel to the first control assembly, the second control assembly comprises a relay switch, a relay, and a MOSFET, the relay switch has a common contact that is electrically connected to a normal close contact and a normal open contact selectively via an elastic conductive piece, the common contact is electrically connected to the power source, the relay serves to control the elastic conductive piece, the normal open contact is electrically connected to a gate of the MOSFET, the normal close contact is electrically connected to a drain terminal of the MOSFET, and a source terminal of the MOSFET is connected to the power source;

the inductive load is disposed between the normal close contact of the relay switch and the normal close contact of the relay switch.

2. The device for controlling inductive load as claimed in claim 1, wherein the common contact of the first control assembly is electrically connected to the positive electrode of the power source, the MOSFET is N type MOSFET, and the source terminal of the N type MOSFET is connected to the negative electrode of the power source; and the common contact of the second control assembly is electrically connected to the positive electrode of the power source, the MOSFET of the second control assembly is N type MOSFET, and the source terminal of the N type MOSFET of the second control assembly is connected to the negative electrode of the power source.

3. The device for controlling inductive load as claimed in claim 1, wherein the common contact of the first control assembly is electrically connected to the negative electrode of the power source, the MOSFET is P type MOSFET, and the source terminal of the P type MOSFET is connected to the positive electrode of the power source; and the common contact of the second control assembly is electrically connected to the negative electrode of the power source, the MOSFET of the second control assembly is P type MOSFET, and the source terminal of the P type MOSFET of the second control assembly is connected to the positive electrode of the power source.

4. The device for controlling inductive load as claimed in claim 1, further comprises a resistance that serves as a current sensor and is electrically connected to the negative electrode of the power source.

5. The device for controlling inductive load as claimed in claim 2, further comprises a resistance that serves as a current sensor and is electrically connected to the negative electrode of the power source.

6. The device for controlling inductive load as claimed in claim 3, further comprises a resistance that serves as a current sensor and is electrically connected to the negative electrode of the power source.

7. The device for controlling inductive load as claimed in claim 1, wherein the first control assembly is equipped with a diode disposed between the common contact and the normal close contact of the relay switch of the first control assembly, the second control assembly is equipped with a diode disposed between the common contact and the normal close contact of the relay switch of the second control assembly, forming a loop, and both ends of the inductive load are connected to the diode of the first control assembly and that of the second control assembly.

8. The device for controlling inductive load as claimed in claim 2, wherein the first control assembly is equipped with a diode disposed between the common contact and the normal close contact of the relay switch of the first control assembly, the second control assembly is equipped with a diode disposed between the common contact and the normal close contact of the relay switch of the second control assembly, forming a loop, and both ends of the inductive load are connected to the diode of the first control assembly and that of the second control assembly.

9. The device for controlling inductive load as claimed in claim 3, wherein the first control assembly is equipped with a diode disposed between the common contact and the normal close contact of the relay switch of the first control assembly, the second control assembly is equipped with a diode disposed between the common contact and the normal close contact of the relay switch of the second control assembly, forming a loop, and both ends of the inductive load are connected to the diode of the first control assembly and that of the second control assembly.

10. The device for controlling inductive load as claimed in claim 4, wherein the first control assembly is equipped with a diode disposed between the common contact and the normal close contact of the relay switch of the first control assembly, the second control assembly is equipped with a diode disposed between the common contact and the normal close contact of the relay switch of the second control assembly, forming a loop, and both ends of the inductive load are connected to the diode of the first control assembly and that of the second control assembly.

11. The device for controlling inductive load as claimed in claim 5, wherein the first control assembly is equipped with a diode disposed between the common contact and the normal close contact of the relay switch of the first control assembly, the second control assembly is equipped with a diode disposed between the common contact and the normal close contact of the relay switch of the second control assembly, forming a loop, and both ends of the inductive load are connected to the diode of the first control assembly and that of the second control assembly.

12. The device for controlling inductive load as claimed in claim 6, wherein the first control assembly is equipped with a diode disposed between the common contact and the normal close contact of the relay switch of the first control assembly, the second control assembly is equipped with a diode disposed between the common contact and the normal close contact of the relay switch of the second control assembly, forming a loop, and both ends of the inductive load are connected to the diode of the first control assembly and that of the second control assembly.

13. The device for controlling inductive load as claimed in claim 1, wherein the inductive load is a motor.

14. The device for controlling inductive load as claimed in claim 2, wherein the inductive load is a motor.

15. The device for controlling inductive load as claimed in claim 3, wherein the inductive load is a motor.

16. The device for controlling inductive load as claimed in claim 7, wherein the inductive load is a motor.

17. The device for controlling inductive load as claimed in claim 8, wherein the inductive load is a motor.

18. The device for controlling inductive load as claimed in claim 10, wherein the inductive load is a motor.

19. The device for controlling inductive load as claimed in claim 11, wherein the inductive load is a motor.

20. The device for controlling inductive load as claimed in claim 12, wherein the inductive load is a motor.

* * * * *